(No Model.)
D. E. WHITFIELD.
SPOOL ATTACHMENT.
No. 556,523. Patented Mar. 17, 1896.
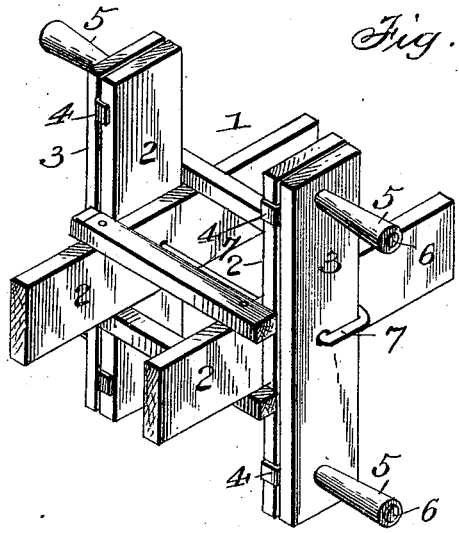
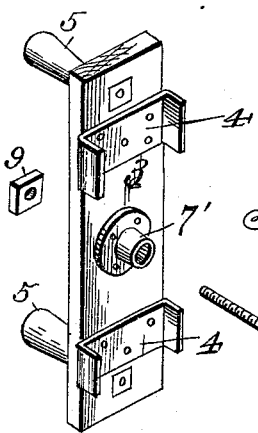
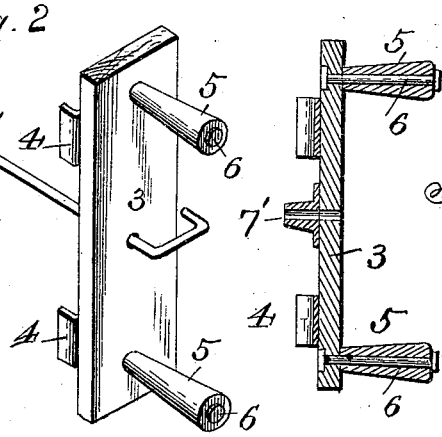
Witnesses
F. L. Ourand
A. P. Smit
Inventor
Daniel E. Whitfield
By H. D. Willson
Attorney.

UNITED STATES PATENT OFFICE.

DANIEL E. WHITFIELD, OF MALVERN, IOWA.

SPOOL ATTACHMENT.

SPECIFICATION forming part of Letters Patent No. 556,523, dated March 17, 1896.

Application filed August 15, 1895. Serial No. 559,390. (No model.)

*To all whom it may concern:*

Be it known that I, DANIEL E. WHITFIELD, a citizen of the United States, residing at Malvern, in the county of Mills and State of Iowa, have invented certain new and useful Improvements in Spool Attachments; and I do declare the following to be a full, clear, and exact description of the invention, such as will enable others skilled in the art to which it appertains to make and use the same.

My invention relates to spool attachments, and more particularly to that class of inventions used in connection with spools employed for winding barbed wire, and is particularly useful in removing such wire when tearing down wire fences.

The object of the invention is to provide a spool attachment which shall be simple of construction, durable in use, and comparatively inexpensive of production.

With this object in view the invention consists of certain features of construction and combination of parts, which will be hereinafter fully described and claimed.

In the accompanying drawings, Figure 1 is a perspective view showing an ordinary wire-spool and my invention applied thereto. Fig. 2 is a detail perspective of the parts forming the attachment, said parts being removed from the spool. Fig. 3 is a longitudinal vertical sectional view through one of the bars of the spool attachment.

In the drawings, 1 denotes a spool, which is of the usual construction, having the cross end pieces 2.

My attachment comprises two bars 3, on the inner faces of which near their upper and lower ends are metal clamp-plates 4, of approximately U shape, which engage the cross-pieces of the spool. On the outer faces of these bars, near their upper and lower ends, are handles 5, one being fixed to one end of the bar and the other being journaled thereto by a bolt 6. A rod 7 passes through the bars about central their length and the hollow trunnions 7' which serve to support the spool and through the core of the spool, and has one end bent to hook over the edge of one of the bars to prevent the rod turning when the nut 9 is screwed upon the opposite end of the rod to clamp the bars firmly against the cross-pieces of the spool.

A device of this character is very simple and may be placed upon the market at a small cost and will be found to be very useful for the purpose for which it is designed.

Having thus described my invention, what I claim, and desire to secure by Letters Patent, is—

The combination with a spool having the cross end pieces, of bars having on their inner faces near their ends metal clasps, and provided on their outer faces near their ends with two sets of handles, one set being fixed and the other set rotatable, and a rod having a bent end which engages the edge of one of said bars, said rod passing through the bars and the core of the spool, and having its other end screw-threaded, and a nut for clamping the bars to the spool, substantially as set forth.

In testimony whereof I affix my signature in presence of two witnesses.

DANIEL E. WHITFIELD.

Witnesses:
   H. E. SCHAFFER,
   A. E. COOK.